July 11, 1933.  R. P. JOHNSON  1,917,976
DISPENSING DEVICE
Filed Oct. 25, 1930   4 Sheets-Sheet 1
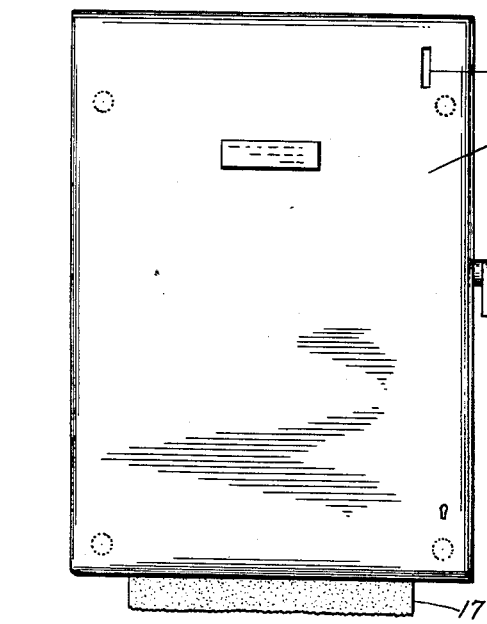
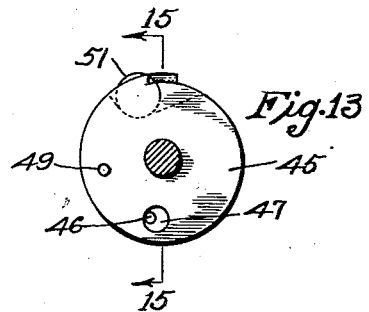
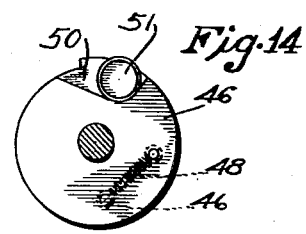
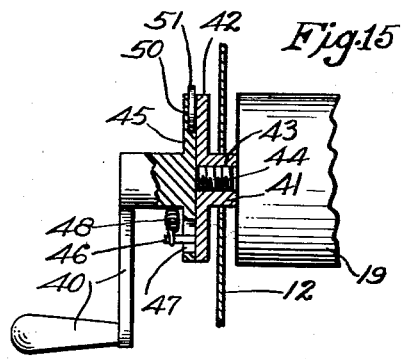
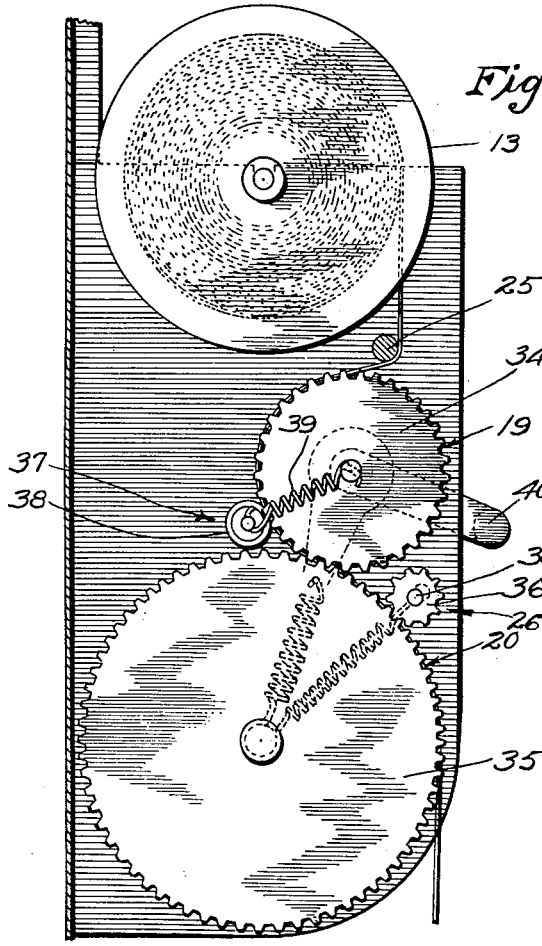
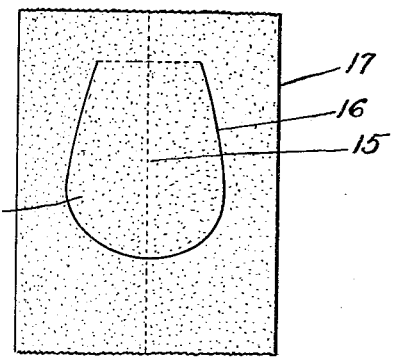
Inventor
Richard P. Johnson
By Townsend, Loftus & Abbett
Attorneys July 11, 1933.  R. P. JOHNSON  1,917,976
DISPENSING DEVICE
Filed Oct. 25, 1930  4 Sheets-Sheet 2
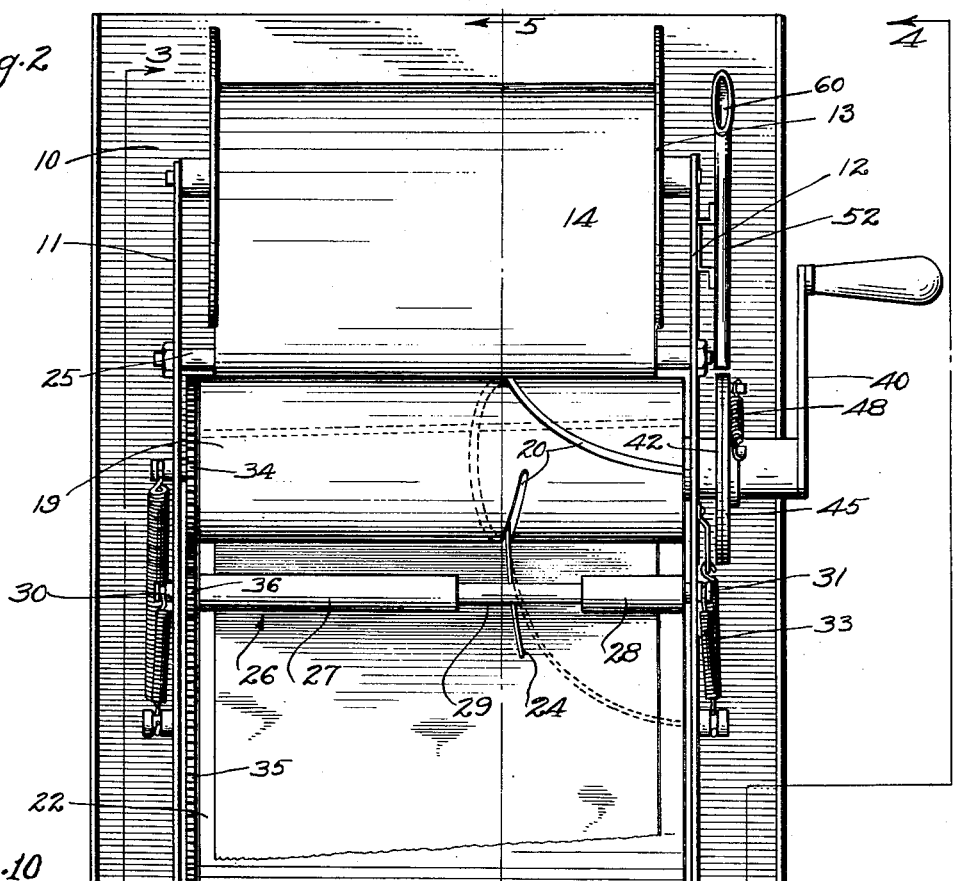
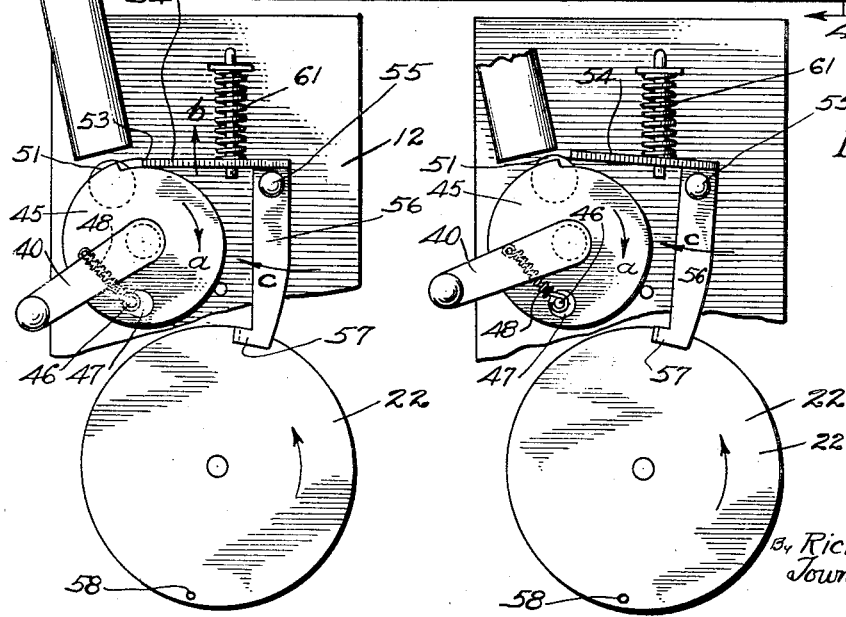
Inventor
Richard P. Johnson
Townsend, Loftus & Abbott
Attorneys July 11, 1933.  R. P. JOHNSON  1,917,976
DISPENSING DEVICE
Filed Oct. 25, 1930  4 Sheets-Sheet 3

Inventor
By Richard P. Johnson
Townsend, Loftus & Abbett
INVENTOR

July 11, 1933. R. P. JOHNSON 1,917,976
DISPENSING DEVICE
Filed Oct. 25, 1930 4 Sheets-Sheet 4
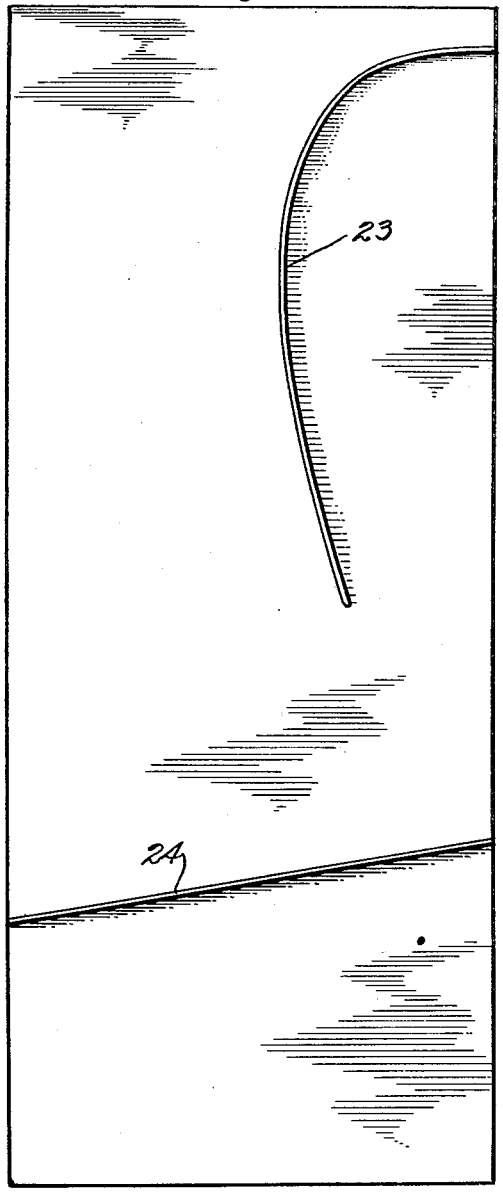
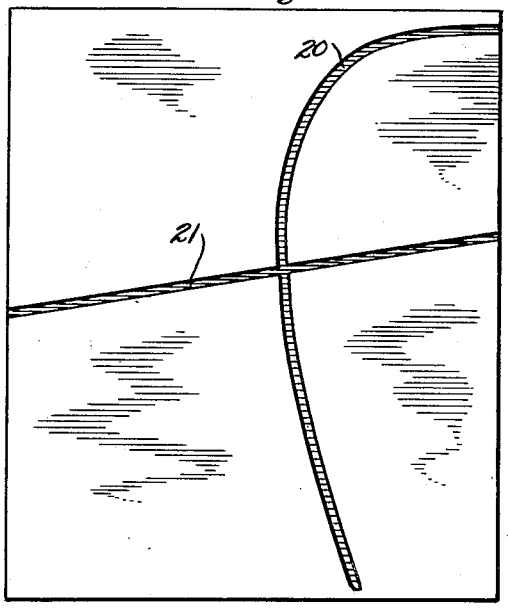
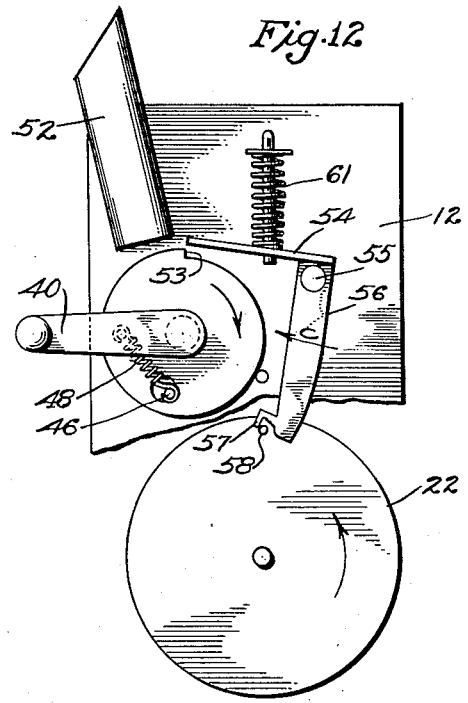
Inventor
Richard P. Johnson
By Townsend, Loftus & Abbett
Attorneys Patented July 11, 1933

1,917,976

UNITED STATES PATENT OFFICE

RICHARD P. JOHNSON, OF LONG BEACH, CALIFORNIA

DISPENSING DEVICE

Application filed October 25, 1930. Serial No. 491,171.

This invention relates to a dispensing device, and particularly pertains to means for forming and dispensing toilet seat covers.

It is the principal object of the present invention to provide a simple machine which may be conveniently positioned in public toilets and may be manually operated to cause a blank sheet of tissue to be moved through the machine and cut to form a toilet seat cover, having a central flap partially cut away to provide an opening and which cover may be conveniently discarded after use, the dispensing device being further designed with coin operated control means whereby the operation of the machine can only be initiated when a coin is deposited therein. The present invention contemplates the provision of a supply roll and a pair of cutting rollers around and between which a folded ribbon of tissue paper is passed, and by which the tissue paper blank is cut to form an opening centrally thereof and therethrough and is cut off into a predetermined length as ejected from the machine. The invention further provides means for locking the cutting rolls against rotation except when a coin has been deposited in the machine.

The invention is illustrated by way of example in the accompanying drawings in which:

Figure 1 is a view in elevation showing the complete machine with which the present invention is concerned.

Fig. 2 is an enlarged view in front elevation showing the machine with the front of the case removed so that the parts may be observed.

Fig. 3 is a view in side elevation as seen on the line 3—3 of Fig. 2 and as showing the gear train of the mechanism and the rolls and rollers.

Fig. 8 is a view showing the developed surface of the blade carrying the cutting roll.

Fig. 9 is a view showing the developed surface of the complementary cutting roll and the grooves therein.

Fig. 10 is an enlarged fragmentary view in side elevation showing the control mechanism in its locked position.

Fig. 11 is an enlarged view in side elevation showing the coin control mechanism as released by the coin.

Fig. 12 is an enlarged fragmentary view in side elevation showing the coin control mechanism as released and as being held in its released position.

Fig. 13 is a view in side elevation showing the relative positions of the coin discs.

Fig. 14 is a view in side elevation showing the movement of the coin disc to a releasing position with relation to the lock disc.

Fig. 15 is a view in vertical section and elevation taken centrally of the coin operating structure and showing the position of the coin therein.

Fig. 16 is a view showing the finished toilet seat cover made and dispensed in the machine with which the present invention is concerned.

Figure 4:
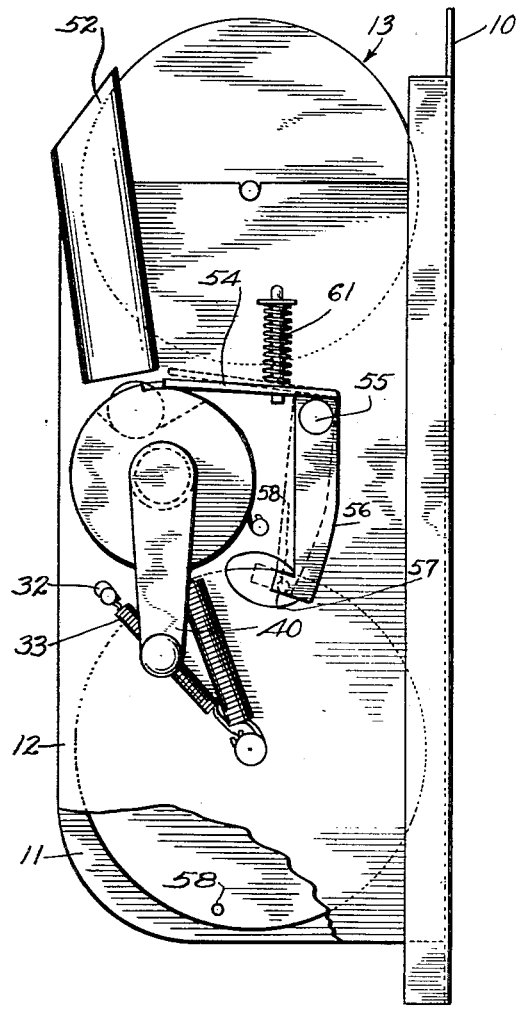
Fig. 4 is an enlarged view in end elevation showing the operating mechanism of the machine, as seen on the line 4—4 of Fig. 2, and viewed in the direction of the arrows.

Referring more particularly to the drawings, 10 indicates a back plate carrying a pair of vertically disposed side plates 11 and 12. Mounted between the side plates 11 and 12 and at the upper end thereof is a spool roller 13 upon which a supply of paper 14 is wound. This paper blank is preferably tissue paper, which is folded upon itself along the median line 15 as indicated in Fig. 16, and whereby the paper may be "broken out" along an arcuate line to form a line of separation 16, as shown in Fig. 16, and to thus provide a body portion 17 which is intended to cover the upper surface of a toilet seat, and a partially cut away flap 18 which hangs downwardly at the front of the seat into the toilet bowl, for sanitary protection purposes. The mechanism for cutting the blank will be described hereinafter.

Figure 5:
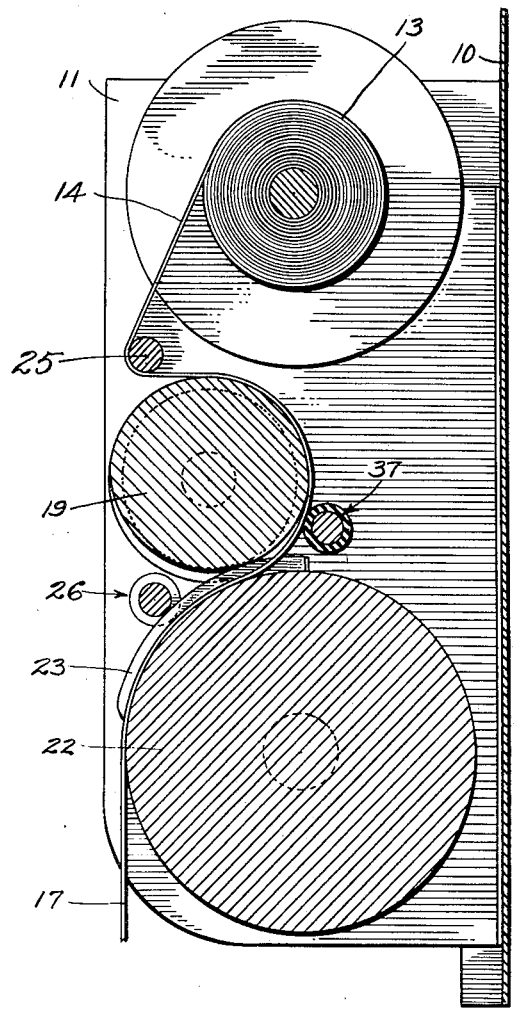
Fig. 5 is a view in vertical section through the machine, as seen on the line 5—5 of Fig. 2 and disclosing the manner in which the paper blank is led through the machine and around and between the rolls and rollers.
Figure 6:
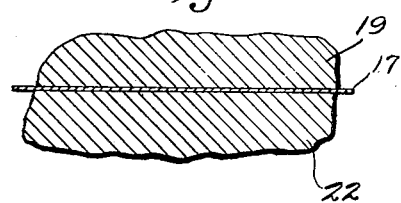
Fig. 6 is a fragmentary view showing adjacent cutting rolls and the manner in which the paper is held taut between them.
Figure 7:
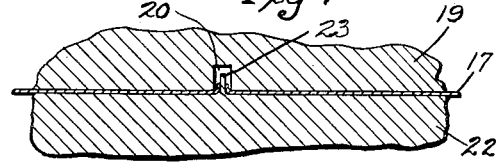
Fig. 7 is a similar view of the adjacent surfaces of the cutting rolls showing the cooperative action of the cutting groove of one roll and the cutting blade of the opposite roll to "break out" the paper blank.

Disposed below the spool 13 and mounted upon a parallel axis between the frame members 11 and 12 is a grooved feed roll 19, the developed surface of which is here shown in Fig. 9. This roll is formed with a groove 20 which agrees in configuration with the line of cut 16 shown at either side of the median line 15 in Fig. 16. A straight diagonal groove 21 is also formed lengthwise of the roller 19 and substantially midway the circumferential length of the roller. Mounted beneath the roller 19 and with its surface in contact therewith as shown in Figs. 6 and 7, is a cutting roller 22. This roller is of substantially twice the diameter of the grooved roller 19 and carries blades 23 and 24 which are complementary to the grooves 20 and 21 respectively, and mesh therewith as the two rollers are rotated. By particular reference to Fig. 7 of the drawings it will be noted that the blades and grooves do not fit to a nicety, but that the width of the groove is considerably greater than the thickness of the blade, thus causing the cutting structure to act to break the paper rather than to shear a clear line of severance therein. By this arrangement the structure can be manufactured at a small proportion of the cost of structures which would require accurate adjustment of the grooves and blades in order to produce a shearing action, and will thus insure that the machine will operate continuously for a long period of time, since it is not necessary to sharpen or adjust any knives. In order to insure that the cutting action will take place along a rather sharp line the paper is held taut between the rolls 19 and 22 due to the intimate contact of these rolls with each other. This is maintained by the fixed bearing in which the trunnions of the rolls are journalled and by reason of a rod 25 around which the paper blank is held, as shown in Fig. 5, and a roller 26 shown in detail in Fig. 2, and which roller has friction contact surfaces 27 and 28, which are interrupted at a point in their length as indicated at 29, to accommodate the cutter blades, and which yieldably hold the paper blank in contact with the surface of the cutting roller. The trunnions 30 and 31 of the roller structure 26 extend through slotted openings 32 formed through the end plates 11 and 12, and are engaged by tension springs 33 which will yieldably hold the roller in its contacting position with relation to the cutting roll 22. This will at all times hold the paper blank taut so that the knife will cleanly tear it.

The grooved roll 19 and the cutting roll 22 are geared together by gears 34 and 35 respectively, as shown in Fig. 3. It is also desirable for the roller 26 to rotate in synchronism with the surface of the roll 22, and for that reason a pinion 36 is secured to the end of the trunnion 30 and is in mesh with the gear 35. A second tension roller 37 is rotatably mounted in the rear of the grooved roll 19 and is provided with a friction surface 38 held in contact with the paper drawn around the roll 19 by springs 39. By reference to Fig. 3, it will be seen that the roller structure 26 and the roller structure 37 contact with the surfaces of the rolls 22 and 19, respectively, and will be disposed upon opposite sides of the line of contact between the rolls 19 and 20, thus firmly holding the length of paper longitudinally at opposite sides of the area in which the "breaking out" action takes place.

It is intended that the machine shall be operated manually and for that purpose a hand crank 40 is applied to rotate the roller 19. In some cases the crank 40 may be directly secured to one trunnion of the crank for operating the same, but in most instances it is desirable to fit the machine with a coin control lock which would only permit movement of the crank lever when a coin had been deposited in the machine. The coin control mechanism is particularly shown in Figs. 4 and 10 to 15, inclusive, of the drawings. Here it will be seen that trunnion 41 of the roller 19 is fitted with a disc 42 having a central bore 43 to receive a pin 44 projecting from the hand crank 40. A disc 45 is formed integral with the hand crank and is held with its flat face abutting against the face of the disc 42. The pin 44 is so mounted within the bore of the trunnion as to permit relative axial movement between the two discs. This movement is limited by a stop pin 46 fixed to the disc 42 and extending through a relative large opening 47 in the disc 45, which will permit the disc 45 to have a limited degree of rotation before the disc 42 begins to rotate. A tension spring 48 is secured by one end to the pin 46 and by its opposite end to a pin 49 carried by the outer disc 45. In this way the two discs will be normally and yieldably held in condition to permit a lost motion movement between the discs before the disc 42 is actuated, and for a purpose hereinafter set forth. The outer disc 45 is formed with a coin receiving recess 50 within which a coin 51 may be deposited as it falls from the lower end of a coin chute 52. The disc 42 is formed with a shoulder 53 which normally engages the end of a lock bar 54 and prevents the disc from rotating so long as the bar is in its obstructing position. The disc 45 is similarly cut away to provide a clearance for the lock bar, and as shown in Fig. 10 of the drawings the lock bar will be held in its locked position to constantly obstruct the rotation of the disc 42 while permitting a slight relative movement of the disc 45. This locking condition is maintained until such time as the coin 51 is placed in the recess of the disc 45 and moved to a position where it will force its way beneath the outer free end of the lock bar 54. The lock bar 54 is mounted upon a fulcrum pin 55 secured to the end plate 12. The lock bar forms one leg of a bell crank, the opposite leg comprising a catch finger 56 which extends downwardly and is fitted with a hooked end 57. This member is required due to the fact that the grooved roll 19 rotates two revolutions while the cutting roll 22 rotates one revolution. This necessitates that the shoulder 53 of the disc 42 will move to a place where it would encounter the end of the lock bar 54 when the cutting roll has completed a half revolution, and which is necessary to move the lock bar at an obstructing position to permit the complete operation of the machine to take place. A pin 58 projects from the end of the roller 22 at a point diametrically opposite from the point at which the roller began operation. The end 57 of the finger 56 stands in the path of this pin and will cause the bell crank, comprising the finger 56 and the lock bar 54, to oscillate and move to a non-obstructing position.

In operation of the present invention the complete mechanism is assembled upon the back member 10 and the side members 11 and 12, and these members are then enclosed by the case 59 with the coin chute 52 in register with the coin opening 60 formed through the case. The supply spool 13 is then wound with the paper 14 which has been previously folded upon itself along a folding line as indicated by the dotted line 15 in Fig. 16. The end of the paper has been led down around the guide rod 25 and then horizontally to contact with the back face of the grooved roller 19, and then downwardly between the grooved roll 19 and the cutting roller 20, during which time it is held in contact with the cylindrical surface of the grooved roller 19 by the presser roll 37, and in contact with the cylindrical face of the cutting roll 22 by the presser roll 26. The free end of the paper ribbon then hangs downwardly and may be discharged through an opening at the bottom of the case. Under normal conditions the grooved roll is locked against rotation by the lock bar 54 which stands in an obstructing position against the shoulder 53 on the disc 42, as clearly shown in Figs. 4 and 10 of the drawings. At such a time the outer disc 45 is held in its retracted position by the spring 48 which engages the pin 49 on the outer disc and the pin 46 on the inner disc 42. When a coin is dropped through the opening 60 into the chute 52, the coin 51 will fall into the recess 50 on the coin disc 45. The operating lever 40 is then rotated in the direction of the arrow "a" and this in turn will rotate the coin disc 45 in a similar direction until the rear face of its opening 47 is moved against the pin 46. At that time the outer disc 45 will engage the pin and impart motion to the lock bar 42.

During the movement of the coin disc 45 and at the time there is lost motion between the two discs the coin 51 will be advanced toward the end of the lock bar 54, and since its circumferential edge extends beyond the periphery of the two discs it will wedge beneath the lock bar 54, causing this bar to swing upwardly in the direction of the arrow "b" as indicated in Fig. 10, and against the compression of spring 61. This bar will be held in its released position until the coin has passed beneath the bar and out of contact therewith, at which time the bar will be caused to rest upon the circumferential edges of the discs 42 and 45 as these discs make one revolution. While the lock bar 54 rests upon the edge of the disc the hooked end 57 of the release finger 56 will extend downwardly and into the path of travel of the pin 58 carried upon the end of the cutting roller 22. Slightly in advance of the moment at which the lock shoulder 53 of the lock disc 42 would come to register with the end of the lock bar 54 the pin 58 engages the hooked end 57 of the finger 56 swinging the finger in the direction of the arrow "c" as indicated in Fig. 12, causing the lock bar 54 to be again lifted to a non-obstructing position so that the grooved roller 19 may make another revolution during the time the cutting roll 22 is making the single revolution.

As the rollers are being rotated the folded paper blank will be unrolled from the spool 13 and will be drawn downwardly around the grooved roller 19 and between the grooved roller 19 and the cutting roller 22. The presser rollers 26 and 38 will hold the paper taut in the area of contact between the rolls 19 and 22 and will thus tend to stretch the paper blank across the grooves 20 and 21 in the roller 19. As the roller 19 and the roller 22 are rotated the blades 23 and 24 on the roller 22 will progressively mesh with the grooves 20 and 21 of the roller 19 and will first cause a line of severance to be made through the two thicknesses of the tissue paper blank, as indicated at 16 in Fig. 16, and thereafter cause the formed sheet to be entirely severed from the blank as the blade 24 of the roller 22 meshes with the groove 21 of the roller 19.

Attention is directed to the fact that while the groove 21 and the blade 24 extend longitudinally of their respective rollers, they do not extend parallel to the axes of the rollers, thus insuring that the paper will be progressively broken throughout its width in a satisfactory manner, and without the necessity of fitting the groove and the blade to produce a shearing action.

It will thus be seen that the device here disclosed provides a simple machine, comprised of view parts which are not liable to get out of order, and which will readily operate to form a sanitary cover for toilet seats and eject the same from the machine, and to further provide a simple and effective coin control mechanism therefor.

While I have shown the preferred form of my invention, as now known to me, it will be understood that various changes may be made in combination, construction, and arrangement of parts by those skilled in the art without departing from the spirit of my invention as claimed.

Having thus described my invention, what I claim and desire to secure by Letters Patent, is:

A device for manufacturing and forming a paper product which comprises a spool rotatably supported on fixed bearings, a rod disposed parallel to the axis of the spool and positioned so that its surface will be substantially in line with the maximum circumference of a roll of paper positioned on said spool, a roller disposed beneath the rod and over which the ribbon of paper is led after it has been led around and beneath the rod, cutting grooves formed in said roller, a tension roller yieldably held against the ribbon of paper led around said cutting groove roller and means for guiding said tension roller so that it will move radially with relation to the surface of the cutter groove roller, a cutting roller disposed beneath the cutter groove roller and carrying a blade adapted to mesh with the groove in the cutting groove roller, means yieldably holding the cutter groove roller and the blade carrying roller in contact with each other whereby the ribbon of paper which is led between them may be broken along a line of severance as the blade meshes with the cutting groove in the opposite roller, and a second tension roller yieldably held against the roller carrying cutter blade and at a point on the opposite side of the line of severance from the first mentioned tension roller, said second named tension roller moving radially with relation to the axis of the blade carrying roller.

RICHARD P. JOHNSON.